United States Patent
Kikutani

(10) Patent No.: US 6,309,989 B1
(45) Date of Patent: Oct. 30, 2001

(54) TIN-BOROPHOSPHATE GLASS AND SEALING MATERIAL

(75) Inventor: Takemi Kikutani, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 0 days.

(21) Appl. No.: 09/449,591

(22) Filed: Nov. 29, 1999

(30) Foreign Application Priority Data

Dec. 1, 1998 (JP) .................................................. 10-341448

(51) Int. Cl.$^7$ ........................... C03C 3/064; C03C 3/066; C03C 3/14; C03C 3/19; C03C 3/17
(52) U.S. Cl. ............................. 501/15; 501/17; 501/24; 501/26; 501/46; 501/47; 501/48; 501/49; 501/51; 501/52; 501/77; 501/79
(58) Field of Search .............................. 501/15, 17, 24, 501/26, 46, 47, 48, 49, 51, 52, 77, 79

(56) References Cited

U.S. PATENT DOCUMENTS

| 4,940,677 | * | 7/1990 | Beall et al. | 501/45 |
| 5,246,890 | * | 9/1993 | Aitken et al. | 501/15 |
| 5,281,560 | * | 1/1994 | Francis et al. | 501/15 |
| 5,330,940 | * | 7/1994 | Aitken et al. | 501/35 |

FOREIGN PATENT DOCUMENTS

09175833-A * 7/1997 (JP).
11292564-A * 10/1999 (JP).

* cited by examiner

*Primary Examiner*—David R Sample
(74) *Attorney, Agent, or Firm*—Collard & Roe, P.C.

(57) ABSTRACT

A tin-borophosphate glass of the present invention has main components of SnO, $B_2O_3$, and $P_2O_5$, consists essentially of, by mole % representation, 30–70% SnO, 5–30% $B_2O_3$, and 24–45% (24% exclusive) $P_2O_5$, and satisfies a condition of $B_2O_3/P_2O_5 \geqq 0.20$ by mole ratio.

6 Claims, No Drawings

TIN-BOROPHOSPHATE GLASS AND SEALING MATERIAL

BACKGROUND OF THE INVENTION

This invention relates to a tin-borophosphate glass and to a sealing material using the same.

As a sealing material for various kinds of materials such as glass, ceramic, and metal, development has been made of a material using a sealing glass.

In order to obtain a strong bonding, it is necessary in a sealing process to heat the sealing glass to a temperature sufficient to wet a sealing surface of a sealed object. However, in sealing electronic components or parts, a sealing temperature must be kept as low as possible. Therefore, in such application, use is mainly made of a sealing material utilizing a low-melting-point lead-borate glass. Specifically, use is widely made of the material having a sealing temperature of 430–500° C. and a thermal expansion coefficient of $70–100 \times 10^{-7}/°$ C.

However, it is recently required that no lead is contained in the sealing glass in view of the environmental problem.

As a lead-free sealing glass, a tin-phosphate glass has been proposed. However, such a glass contains a large amount of $P_2O_5$ as a main glass-forming oxide and therefore tends to exhibit following defects inherent to a phosphate glass: 1) the thermal expansion coefficient is increased, 2) the mechanical strength is decreased in comparison with existing sealing glasses, 3) the weather resistance is degraded, 4) a glass component left uncrystallized is released or eluted, and 5) heavy bubbling occurs during vitrification because phosphate is used as a raw material. As a result, practical use is not yet commenced.

SUMMARY OF THE INVENTION

It is an object of the present invention to provide a glass which does not contain a lead component but has characteristics equivalent to those of an existing sealing glass, and a sealing material using the same.

Taking the above-mentioned circumstances into consideration, the present inventor has carried out various experiments. As a result, it has been found out that the above-mentioned object is achieved by introducing $B_2O_3$ as a main glass-forming oxide and satisfying a condition of $B_2O_3/P_2O_5 \geq 0.20$ by mole ratio. This finding is herein proposed as the present invention.

Specifically, a tin-borophosphate glass according to the present invention contains SnO, $B_2O_3$, and $P_2O_5$ as main components, consists essentially of, by mole % representation, 30–70% SnO, 5–30% $B_2O_3$, and 24.1–45% $P_2O_5$, and satisfies a condition of $B_2O_3/P_2O_5 \geq 0.20$ by mole ratio.

DESCRIPTION OF THE INVENTION

Description will hereafter be made as regards the reason why the contents of SnO, $B_2O_3$, and $P_2O_5$ as the main components of the glass are defined as specified above.

SnO is a component for lowering the melting point of the glass. When the content of SnO is less than 30%, the viscosity of glass is increased so that the sealing temperature becomes excessively high. When the content is more than 70%, vitrification is difficult to occur. A preferable range of SnO is 35–65%.

$B_2O_3$ is a glass-forming oxide. When the content of $B_2O_3$ is less than 5%, vitrification takes place, but a scum is produced by separation of the glass. When the content exceeds 30%, the viscosity is increased so that the flow is difficult. When the content of $B_2O_3$ is 20% or less, the glass tends to be unstable so that the weather resistance is decreased. Accordingly, a preferable range of $B_2O_3$ is 20.1–30%.

$P_2O_5$ is a glass-forming oxide. When the content of $P_2O_5$ is within a range of 24% or less, stability of the glass is not sufficient. When the content exceeds 45%, the weather resistance of the glass itself is deteriorated and the viscosity of the glass is increased so that the flow is difficult. A preferable range of $P_2O_5$ is 25–35%.

In the present invention, it is important that the ratio of $B_2O_3$ and $P_2O_5$ satisfies a condition of $B_2O_3/P_2O_5 \geq 0.20$ by mole ratio. When the value is less than 0.20, the above-mentioned defects inherent to the phosphate glass are readily caused. In particular, the weather resistance characteristic is extremely degraded. A preferable range of $B_2O_3/P_2O_5$ is 0.40 or more.

In the glass of the present invention, various components may be added to the above-mentioned main components. For example, glass stabilizing components such as ZnO, $Al_2O_3$, $SiO_2$, $WO_3$, $MoO_3$, $Nb_2O_5$, $TiO_2$, $ZrO_2$, $R_2O$ (R being Li, Na, K, or Cs), CuO, MnO, and R'O (R' being Mg, Ca, Sr, or Ba) can be added to 35% or less in total. The reason why the content of these stabilizing components is limited to 35% or less is that, if the content exceeds 35%, the glass becomes unstable and is readily devitrified upon forming.

Description will hereafter be made as regards the contents of the stabilizing components (mole % representation) and the reason of limitation thereof.

ZnO has not only a function of stabilizing the glass but also an effect of lowering the thermal expansion coefficient. The content is 0–25%, preferably, 0.1–15%. When the content of ZnO is more than 25%, the tendency of crystallization of the glass is extremely increased so that the flowability is likely to be lowered.

The content of each of $Al_2O_3$ and $SiO_2$ is 0–10%, preferably, 0–5%. When the content of each component exceeds 10%, the viscosity of the glass is readily increased.

The content of each of $WO_3$ and $MoO_3$ is 0–20%, preferably, 0–10%. When the content of each component exceeds 20%, the viscosity of the glass is likely to be increased.

The content of each of $Nb_2O_5$, $TiO_2$, and $ZrO_2$ is 0–15%, preferably, 0–10%. When the content of each component exceeds 15%, the tendency of crystallization of the glass is likely to be extremely increased.

The content of $R_2O$ is 0–35%, preferably, 0–15%. When the content of $R_2O$ exceeds 35%, the tendency of crystallization of the glass is likely to be extremely increased.

The content of each of CuO and MnO is 0–10%, preferably, 0–5%. When the content of each component exceeds 10%, the glass is likely to become unstable.

The content of R'O is 0–15%, preferably, 0–5%. When the content of R'O exceeds 15%, the glass is likely to become unstable.

The glass having the above-mentioned composition has a glass transition point of 280–380° C., and exhibits an excellent flowability at a temperature of 500° C. or less. In addition, the glass has a thermal expansion coefficient on the order of $95–150 \times 10^{-7}/°$ C. at 30–250° C.

The tin-borophosphate glass of the present invention having the above-mentioned characteristics can be used alone as a sealing material for a material matched in thermal expansion coefficient. On the other hand, in order to seal a material unmatched in thermal expansion coefficient, for example, alumina ($70 \times 10^{-7}$/° C.) or a window panel glass ($80 \times 10^{-7}$/° C.), this glass can be used as a composite with refractory filler powder comprising a low-expansion material. The refractory filler powder may be added for other purposes than control of the thermal expansion coefficient, for example, in order to improve the mechanical strength.

When the refractory filler powder is mixed, the mixing ratio is preferably within a range of 50–100 vol % of the glass powder and 0–50 vol % of the filler powder. This is because, when the filler powder is more than 50 vol %, the ratio of the glass powder is relatively lowered so that the flowability necessary as the sealing material is difficult to obtain. As the refractory filler powder, use can be made of various materials, for example, cordierite, zircon, tin oxide, niobium oxide, zirconium phosphate, willemite, and mullite. Specially, NbZr ($PO_4$) ceramic powder with 2 wt % MgO added thereto well matches with the tin-borophosphate glass of the present invention because phosphate is contained in the component.

In order to produce the sealing material using the tin-borophosphate glass of the present invention, a raw material is at first prepared to have the above-mentioned composition and is melted to be vitrified. It is necessary to carefully avoid oxidization of SnO into $SnO_2$ during melting. However, the glass of the present invention need not essentially be melted in an anti-oxidizing atmosphere such as an $N_2$ atmosphere in order to prevent oxidization but can be melted in the air without any disadvantage. Thereafter, the glass melt is formed, pulverized, and classified. If necessary, the refractory filler powder is added and mixed. Thus, the sealing material is obtained.

An example of use of the sealing material thus produced will be described. At first, the sealing material is applied to a sealing surface of each of sealed objects. Upon applying, the sealing material may be used in the form of paste. Thereafter, baking is carried out in condition sufficient for the glass to wet the sealing surface of the sealed object. In this manner, the sealed objects are sealed to each other.

EXAMPLES

Hereinafter, the present invention will be described in detail in conjunction with examples.

Example 1

Tables 1 and 2 show examples of the present invention (Samples Nos. 1–9) and a comparative example (Sample No. 10).

TABLE 1

| | (mol%) | | | | |
|---|---|---|---|---|---|
| | Examples of the Present Invention | | | | |
| Sample No. | 1 | 2 | 3 | 4 | 5 |
| Glass Composition | | | | | |
| SnO | 42.0 | 46.0 | 50.0 | 46.0 | 44.5 |
| $B_2O_3$ | 25.0 | 22.0 | 17.5 | 21.0 | 21.0 |
| $P_2O_5$ | 28.0 | 25.0 | 27.0 | 25.0 | 25.0 |
| ZnO | 5.0 | 5.0 | 5.0 | 7.0 | 9.0 |
| $Al_2O_3$ | 2.0 | 2.0 | 0.5 | 1.0 | 0.5 |

TABLE 1-continued

| | (mol%) | | | | |
|---|---|---|---|---|---|
| | Examples of the Present Invention | | | | |
| Sample No. | 1 | 2 | 3 | 4 | 5 |
| $B_2O_3/P_2O_5$ | 0.89 | 0.90 | 0.65 | 0.80 | 0.80 |
| Melting Temperature (° C.) | 850 | 800 | 850 | 800 | 800 |
| Baking Temperature (° C.) | 480 | 480 | 480 | 480 | 480 |
| Glass Transition Point (° C.) | 345 | 340 | 280 | 295 | 307 |
| Thermal Expansion Coefficient ($\times 10^{-7}$/° C.) | 105 | 103 | 110 | 105 | 98 |
| Flow Diameter (mm) | 23.0 | 23.9 | 27.0 | 24.0 | 22.5 |
| Weather Resistance | ⊚ | ⊚ | ○ | ⊚ | ⊚ |

TABLE 2

| | (mol%) | | | | |
|---|---|---|---|---|---|
| | Examples of the Present Invention | | | | Comparative Example |
| Sample No. | 6 | 7 | 8 | 9 | 10 |
| Glass Composition | | | | | |
| SnO | 55.0 | 60.0 | 47.0 | 48.0 | 50.0 |
| $B_2O_3$ | 14.5 | 14.5 | 18.0 | 15.0 | 6.0 |
| $P_2O_5$ | 25.0 | 30.0 | 28.0 | 30.0 | 37.0 |
| ZnO | 5.0 | 5.0 | 5.0 | 5.0 | 5.0 |
| $Al_2O_3$ | 1.5 | 1.5 | 2.0 | 2.0 | 2.0 |
| $B_2O_3/P_2O_5$ | 0.58 | 0.48 | 0.64 | 0.50 | 0.16 |
| Melting Temperature (° C.) | 800 | 800 | 800 | 800 | 850 |
| Baking Temperature (° C.) | 480 | 480 | 480 | 480 | 480 |
| Glass Transition Point (° C.) | 290 | 268 | 310 | 300 | 315 |
| Thermal Expansion Coefficient ($\times 10^{-7}$/° C.) | 114 | 120 | 105 | 108 | 110 |
| Flow Diameter (mm) | 25.5 | 27.0 | 24.5 | 25.1 | 24.0 |
| Weather Resistance | ○ | ○ | ○ | ○ | X |

Each of the samples was prepared as follows. At first, a glass batch of raw materials was prepared to have a composition shown in the tables and melted in the air at a temperature of 700–1000° C. for 1–2 hours. Then, a glass melt was made to pass between water-cooled rollers to be formed into a thin plate, pulverized by a ball mill, and thereafter made to pass through a 105 μm-mesh sieve to obtain a sample of glass powder having an average particle size of about 10 μm.

Next, each sample was evaluated for the glass transition point, the thermal expansion coefficient, the flowability, and the weather resistance. As a result, in each of the samples Nos. 1–9 as the examples of the present invention, the glass transition point was 268–345° C. while the thermal expansion coefficient at 30–250° C. was 98–114×$10^{-7}$/° C. A flow diameter was 22.5–27.0 mm and the flowability was excellent. Furthermore, each sample was excellent in weather resistance.

On the other hand, in the sample No. 10 as the comparative example in which the mole ratio of $B_2O_3/P_2O_5$ is less than 0.20, the glass transition point, the thermal expansion coefficient, and the flowability were equivalent to those of the examples of the present invention, but the weather resistance was inferior thereto.

The glass transition point was calculated by the differential thermal analysis (DTA) and the thermal expansion coefficient was measured by a push-rod dilatometer. The flowability was evaluated as follows. At first, the glass powder of the weight corresponding to the absolute specific gravity of the glass was pressed by a die into the shape of a button having an outer diameter of 20 mm. Next, this button was put on a window panel glass, heated in the air to the baking temperature shown in the tables at a rate of 10° C./min, and kept at the temperature for ten minutes. Thereafter, the diameter of the button was measured. The weather resistance was evaluated as follows. The button-shaped sample similarly prepared was kept for 50 hours in a constant-temperature and constant-humidity tank (temperature 85° C., humidity 85%). Thereafter, the surface of the sample was observed with an optical microscope. The symbol ⊙ represents no change in the surface condition. The symbol ○ represents presence of darkening but absence of any released or eluted component. The symbol x represents confirmed presence of such released or eluted component.

Example 2

The sealing material was produced by mixing 75 vol % of the glass powder of the sample No. 4 prepared in the example 1 and 25 vol % of the NbZr (PO$_4$) ceramic powder with 2 wt % MgO added thereto.

Next, the thermal expansion coefficient and the flowability were evaluated in the manner similar to the example 1. As a result, the thermal expansion coefficient at 30–250° C. was $75 \times 10^{-7}/°$ C., which is a value appropriate to the sealing of the window panel glass. In addition, the flow diameter was 23.0 mm and the flowability was excellent.

As the NbZr(PO$_4$)$_3$ ceramic powder, niobium pentaoxide, low α-ray zirconia, ammonium dihydrogenphosphate, and magnesia were mixed, baked at 1450° C. for 16 hours, and thereafter pulverized to obtain the powder of an average particle size of 5 μm.

As described above, the tin-borophosphate glass according to the present invention has a glass transition point of 280–380° C. and exhibits an excellent flowability at 500° C. or less. Furthermore, those defects inherent to the phosphate glass are eliminated. Therefore, it is possible to produce a non-lead sealing material equivalent in performance to the existing product. In addition to the use as the sealing material, use may be made for various purposes, for example, as a barrier rib forming material for a PDP.

The sealing material of the present invention allows low-temperature sealing and can be controlled by the use of a filler to the thermal expansion coefficients adapted to various materials. Therefore, the sealing material is suitable as a substitute for a lead-based sealing material used in an electronic component of a magnetic head, a cathode-ray tube (CRT), a plasma display (PDP), a vacuum fluorescent display (VFD), or the like.

What is claimed is:

1. A tin-borophosphate glass having main components of SnO, B$_2$O$_3$, and P$_2$O$_5$, which consists essentially of, by mole % representation, 30–70% SnO, 20.1–30% B$_2$O$_3$, and 24.1–45% P$_2$O$_5$, satisfies a condition of B$_2$O$_3$/P$_2$O$_5$≧0.20 by mole ratio, and further optionally contains 0 to 25% ZnO as a stabilizing component.

2. A tin-borophosphate glass as claimed in claim 1, wherein said glass further contains at least one stabilizing component selected from the group consisting of said ZnO, Al$_2$O$_3$, SiO$_2$, WO$_3$, MoO$_3$, Nb$_2$O$_5$, TiO$_2$, ZrO$_2$, R$_2$O (R being Li, Na, K, or Cs), CuO, MnO, and R'O (R' being Mg, Ca, Sr, or Ba) to the amount of 35% or less in total.

3. A tin-borophosphate glass as claimed in claim 2, wherein the content of each stabilizing component is, by mole % representation, 0–10% Al$_2$O$_3$, 0–10% SiO$_2$, 0–20% WO$_3$, 0–20% MoO$_3$, 0–15% Nb$_2$O$_5$, 0–15% TiO$_2$, 0–15% ZrO$_2$, 0–35% R$_2$O, 0–10% CuO, 0–10% MnO, and 0–15% R'O.

4. A sealing material comprising tin-borophosphate glass powder of 50–100 vol % and refractory filler powder of 0–50 vol %, said tin borophosphate glass powder having main components of SnO, B$_2$O$_3$, and P$_2$O$_5$ and consisting essentially of, by mole % representation, 30–70% SnO, 20.1–30% B$_2$O$_3$, and 24.1–45% P$_2$O$_5$, satisfying a condition of B$_2$O$_3$/P$_2$O$_5$≧0.20 by mole ratio, and optionally containing 0 to 25% ZnO as a stabilizing component.

5. A sealing material as claimed in claim 4, wherein said tin-borophosphate glass powder further contains at least one stabilizing component selected from the group consisting of said ZnO, Al$_2$O$_3$, SiO$_2$, WO$_3$, MoO$_3$, Nb$_2$O$_5$, TiO$_2$, ZrO$_2$, R$_2$O (R being Li, Na, K, or Cs), CuO, MnO, and R'O (R' being Mg, Ca, Sr, or Ba) to the amount of 35% or less in total.

6. A sealing material as claimed in claim 5, wherein the content of each stabilizing component of said tin-borophosphate glass powder is, by mole % representation, 0–10% Al$_2$O$_3$, 0–10% SiO$_2$, 0–20% WO$_3$, 0–20% MoO$_3$, 0–15% Nb$_2$O$_5$, 0–15% TiO$_2$, 0–15% ZrO$_2$, 0–35% R$_2$O, 0–10% CuO, 0–10% MnO, and 0–15% R'O.

* * * * *